(12) United States Patent
Mu et al.

(10) Patent No.: US 12,745,315 B2
(45) Date of Patent: Sep. 22, 2026

(54) METHOD AND APPARATUS FOR TRANSMITTING INDICATION INFORMATION, AND READABLE STORAGE MEDIUM

(71) Applicants: Beijing Xiaomi Mobile Software Co., Ltd., Beijing (CN); Beijing University of Posts and Telecommunications, Beijing (CN)

(72) Inventors: Qin Mu, Beijing (CN); Wei Hong, Beijing (CN); Zhongyuan Zhao, Beijing (CN); Chao Jia, Beijing (CN); Jingyi Wang, Beijing (CN)

(73) Assignees: BEIJING XIAOMI MOBILE SOFTWARE CO., LTD., Beijing (CN); BEIJING UNIVERSITY OF POSTS AND TELECOMMUNICATIONS, Beijing (CN)

( * ) Notice: Subject to any disclaimer, the term of this patent is extended or adjusted under 35 U.S.C. 154(b) by 273 days.

(21) Appl. No.: 18/566,012

(22) PCT Filed: Jun. 1, 2021

(86) PCT No.: PCT/CN2021/097768
§ 371 (c)(1),
(2) Date: Nov. 30, 2023

(87) PCT Pub. No.: WO2022/252127
PCT Pub. Date: Dec. 8, 2022

(65) Prior Publication Data

US 2024/0260130 A1 Aug. 1, 2024

(51) Int. Cl.
*H04W 76/28* (2018.01)
*H04L 41/16* (2022.01)
*H04W 72/23* (2023.01)

(52) U.S. Cl.
CPC ............ *H04W 76/28* (2018.02); *H04L 41/16* (2013.01); *H04W 72/23* (2023.01)

(58) Field of Classification Search
CPC ..... H04W 76/28; H04W 72/23; H04W 52/02; H04L 41/16; Y02D 30/70
See application file for complete search history.

(56) References Cited

U.S. PATENT DOCUMENTS

2011/0212742 A1* 9/2011 Chen ................ H04W 52/0216 455/507
2014/0105049 A1* 4/2014 Kim ..................... H04L 5/0057 370/252
(Continued)

FOREIGN PATENT DOCUMENTS

CN 101656978 A 2/2010
CN 102196540 A 9/2011
(Continued)

OTHER PUBLICATIONS

Medium Access Control (MAC) protocol specification 3GPP TS 38.321, Mar. 2021 (Mar. 2021), entire document; Type-A.
(Continued)

*Primary Examiner* — Rasheed Gidado
(74) *Attorney, Agent, or Firm* — Volpe Koenig

(57) ABSTRACT

A method for transmitting indication information, includes: determining a discontinuous reception mode of a user equipment according to service data traffic and channel state information of the user equipment in a current discontinuous reception period; and transmitting first indication information to the user equipment, where the first indication information is used to indicate the discontinuous reception mode.

19 Claims, 6 Drawing Sheets

(56) References Cited

U.S. PATENT DOCUMENTS

| | | | | |
|---|---|---|---|---|
| 2019/0215897 | A1 | 7/2019 | Babaei et al. | |
| 2019/0349120 | A1* | 11/2019 | Cheng | H04L 5/0053 |
| 2020/0389933 | A1 | 12/2020 | Ang et al. | |
| 2020/0396682 | A1 | 12/2020 | Vivanco | |
| 2021/0028844 | A1* | 1/2021 | Song | H04W 76/28 |
| 2021/0084516 | A1* | 3/2021 | Rungta | H04L 5/0051 |
| 2021/0105606 | A1 | 4/2021 | Bendlin et al. | |
| 2021/0251037 | A1* | 8/2021 | Akkarakaran | H04W 76/28 |
| 2022/0303959 | A1* | 9/2022 | Khoshnevisan | H04L 1/0072 |

FOREIGN PATENT DOCUMENTS

| | | | |
|---|---|---|---|
| CN | 103024879 | A | 4/2013 |
| CN | 103298085 | A | 9/2013 |
| CN | 110351813 | A | 10/2019 |
| CN | 110493855 | A | 11/2019 |
| CN | 111247841 | A | 6/2020 |
| CN | 111937474 | A | 11/2020 |
| CN | 112118590 | A | 12/2020 |
| CN | 112118616 | A | 12/2020 |
| WO | 2020168330 | A1 | 8/2020 |
| WO | 2021089429 | A2 | 5/2021 |

OTHER PUBLICATIONS

"Radio Resource Control (RRC) protocol specification", 3GPP TS 38.331, Mar. 2021 (Mar. 2021), entire document; Type-A.

"Study on User Equipment (UE) power saving in NR", 3GPP TR 38.840, Jun. 2019 (Jun. 2019) entire document; Type-A.

Huawei. "Power saving signal/channel/procedure for triggering adaptation" 3GPP TSG RAN WG1 Ad-Hoc Meeting 1901 R1-1900041, Jan. 25, 2019 (Jan. 25, 2019), entire document; Type-A.

Huawei. "Analysis and evaluation of go-to-sleep signaling scheme" 3GPP TSG RAN WG1 Ad-Hoc Meeting 1901 R1-1901245, Jan. 25, 2019 (Jan. 25, 2019), entire document; Type-A.

Nokia. "Comparison of DRX with WUS and GTS schemes" 3GPP TSG RAN WG1 #96 R1-1903133, Mar. 1, 2019 (Mar. 1, 2019) entire document; Type-A.

Ericsson. "DRX framework for NR" 3GPP TSG-RAN WG2 #97 Tdoc R2-1700848, Feb. 17, 2017 (Feb. 17, 2017), entire document; Type-A.

* cited by examiner

METHOD AND APPARATUS FOR TRANSMITTING INDICATION INFORMATION, AND READABLE STORAGE MEDIUM

CROSS REFERENCE TO RELATED APPLICATION

The present application is a U.S. National Stage of International Application No. PCT/CN2021/097768, filed on Jun. 1, 2021, the contents of all of which are incorporated herein by reference in their entireties for all purposes.

BACKGROUND

User experience is tied to power consumption of user equipment, which will affect application of the user equipment in a fifth-generation (5G) new radio (NR) system. In view of this, it is crucial to study the power consumption of the user equipment.

Since the NR system supports high-speed data transmission, burst user data will be serviced by a network in a short time. An effective energy-saving mechanism for the user equipment is to trigger the user equipment to access the network in a discontinuous reception (DRX) mode. When there is no service to be transmitted, the network can help the user equipment switch from a network access mode to the DRX mode. Unless an energy-saving framework notifies the user equipment of network access, the user equipment will stay in the DRX mode, for example, in a micro-sleep state.

SUMMARY

In view of this, a method and apparatus for transmitting indication information, and a medium are provided in examples of the disclosure.

In a first aspect, a method for transmitting indication information is provided in an example of the disclosure. The method is performed by a base station, and includes: determining a discontinuous reception mode of user equipment according to service data traffic and channel state information of the user equipment in a current discontinuous reception period; and transmitting first indication information to the user equipment, where the first indication information is used to indicate the discontinuous reception mode.

In a second aspect, a method for transmitting indication information is provided in an example of the disclosure. The method is performed by user equipment, and includes: receiving first indication information from a base station, where the first indication information is used to indicate a discontinuous reception mode; and executing discontinuous reception according to the discontinuous reception mode.

In a third aspect, the disclosure provides a communication apparatus. The communication apparatus includes a processor and a memory, where the memory is used to store a computer program; and the processor is used to execute the computer program to implement the first aspect or any one of possible designs of the first aspect.

In a fourth aspect, the disclosure provides a communication apparatus. The communication apparatus includes a processor and a memory, where the memory is used to store a computer program; and the processor is used to execute the computer program to implement the second aspect or any one of possible designs of the second aspect.

In a fifth aspect, the disclosure provides a computer-readable storage medium. The computer-readable storage medium stores an instruction (also known as a computer program and a program), where the instruction causes a computer to execute the first aspect or any one of possible designs of the first aspect when called and executed on the computer.

In a sixth aspect, the disclosure provides a computer-readable storage medium. The computer-readable storage medium stores an instruction (also known as a computer program and a program), where the instruction causes a computer to execute the second aspect or any one of possible designs of the second aspect when called and executed on the computer.

It should be understood that the above general description and the following detailed description are only illustrative and explanatory, and cannot limit the disclosure.

BRIEF DESCRIPTION OF THE DRAWINGS

The accompanying drawings described here serve to provide a further understanding of the examples of the disclosure and form a part of the disclosure. The examples of the disclosure and the description of the examples serve to explain the examples of the disclosure and are not to be construed as unduly limiting the examples of the disclosure. In the figures.

The accompanying drawings here, which are incorporated in the description as a constituent part of the present description, illustrate the examples satisfying the examples of the disclosure and are used to explain the principles of the examples of the disclosure together with the description.

DETAILED DESCRIPTION

Figure 1:
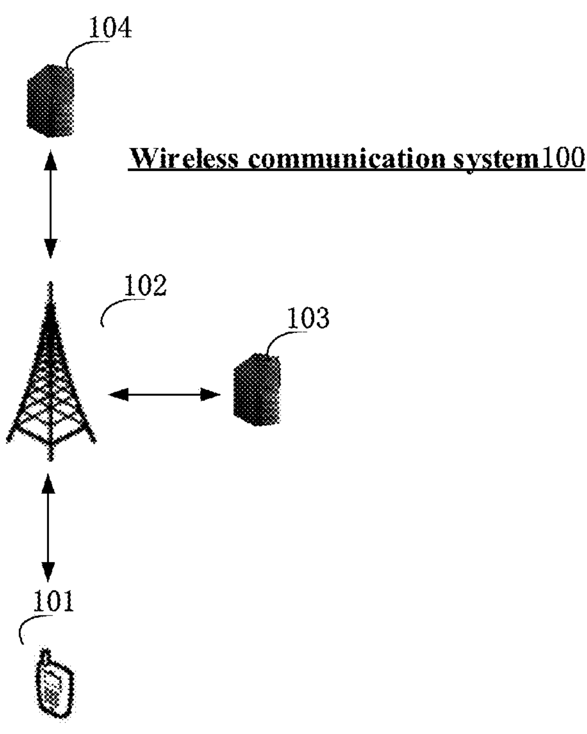
FIG. 1 is a schematic diagram of a system architecture according to an example.

The examples of the disclosure will be further described now in combination with the accompanying drawings and the specific embodiments.

The examples will be described in detail here and illustratively shown in the accompanying drawings. When the following descriptions relate to the accompanying drawings, unless otherwise specified, the same numeral in different accompanying drawings denotes the same or similar element. The embodiments described in the following examples do not denote all embodiments consistent with the examples of the disclosure. On the contrary, the embodiments are merely examples of an apparatus and a method consistent with some aspects of the disclosure as detailed in the appended claims.

The power consumption is minimized through new wake-up or entry to a sleep mechanism. It also matters to reduce the power consumption during network access in a radio resource control (RRC)_CONNECTED state. Furthermore, a method for enhancing the transition between the network access mode and the DRX mode should be considered. Both network-assisted and user equipment-assisted methods should be considered in the energy-saving mechanism for the user equipment.

With the energy-saving solution of adapting the user equipment to the DRX mode, an energy-saving signal or channel is configured by means of triggering of the energy-saving signal or channel ahead of or at the beginning of DRX ON duration, and to trigger the user equipment wake-up only when downlink data arrives. If no energy-saving signal is detected, no user equipment needs to be woken up during the DRX ON duration at least during monitoring of a physical downlink control channel (PDCCH). A sleep signaling serves to instruct the user equipment to return to a sleep state after the user equipment completes reception of a physical downlink share channel (PDSCH) throughout the DRX ON duration, so as to further reduce the power consumption of the user equipment.

In a possible execution process, a base station determines whether to transmit a wake-up service (WUS) signal to a user according to whether there is new data currently transmitted from a network side to the user. The base station transmits the WUS signal to the user, so as to wake up the user to enter a DRX ON state to receive data when determining that the network transmits the new data to the user. If no new data from the network side arrives, the base station does not transmit the WUS signal, and the user skips the DRX ON state to stay in the sleep state.

In a possible execution process, a base station determines whether to transmit a sleep signal to a user according to whether there is new data currently transmitted from a network side to the user. The base station transmits a sleep signal to the user when determining that there is no new data currently transmitted from the network to the user, such that the user stays in the sleep state for a set period of time (which is a fixed number of time slots in general), and then is woken up again and enters the DRX ON state.

How to maintain effective balance between an energy-saving effect and service quality is a technical problem to be solved. As for this, a method and apparatus for transmitting indication information, and a readable storage medium related to the technical field of wireless communication are provided in the disclosure.

With reference to FIG. 1 being a schematic diagram of a wireless communication system 100 architecture according to an example of the disclosure, a system 100 includes user equipment 101, a base station 102, a server 103, and an operation administration and maintenance (OAM) entity 104. The user equipment 101 and the base station 102 communicate by means of a wireless channel, the base station 102 and the server 103 communicate by means of a wired channel, and the base station 102 and the OAM entity 104 communicate by means of a wired channel.

Figure 2:
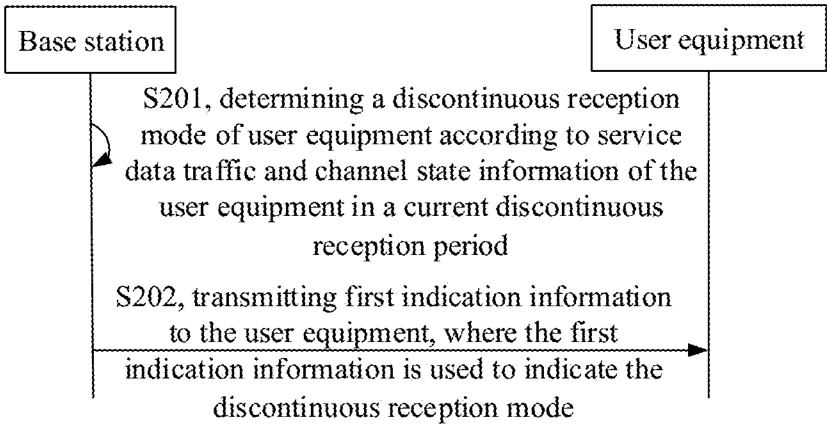
FIG. 2 is a flow chart of a method for transmitting indication information according to an example.

A method for transmitting indication information is provided in an example of the disclosure. The method is performed by a base station. With reference to FIG. 2, FIG. 2 is a flow chart of a method for transmitting indication information according to an example. As shown in FIG. 2, the method includes steps S201 and S202.

In S201, determine a discontinuous reception (DRX) mode of user equipment according to service data traffic and channel state information (CSI) of the user equipment in a current DRX period.

In S202, transmit first indication information to the user equipment, where the first indication information is used to indicate the DRX mode.

In the example of the disclosure, the DRX mode of the user equipment is determined according to the service data traffic and the CSI of the user equipment in the current DRX period such that the DRX mode determined can be correlated with a real-time communication situation, thus making the DRX mode more intelligent and reasonable.

A method for transmitting indication information is provided in an example of the disclosure. The method is performed by a base station. The method includes: inputting the service data traffic and the CSI of the user equipment in the current DRX period into a deep learning model, determining N evaluation values output by the deep learning model, and determining a DRX mode corresponding to a maximum evaluation value of the N evaluation values. Then transmitting first indication information to the user equipment, where the first indication information is used to indicate the DRX mode.

In some possible embodiments, a deep learning model is a deep reinforcement learning model.

In some possible embodiments, a deep learning model is a neural network model. A structure of the neural network model may be set by the following method. The structure of the deep neural network model mainly includes an input layer, an output layer and a hidden layer. Two nodes may be set on the input layer, and are used to input service data traffic and CSI respectively; L layers of hidden layers may be set, a value of L gives consideration to two aspects of model capacity and model generalization capability, and S nodes may be set on each hidden layer; and the output layer is responsible for outputting a final result, N nodes may be set on the output layer, and correspond to Q value results of each DRX mode, and N depends on the number of the set DRX modes.

A connection mode of the neural network model may be set by the following method. For the connection mode between layers, it may be considered that the hidden layer and the input layer as well as the hidden layer are fully connected, and a rectifier linear unit (relu) function may be used as an activation function; the hidden layer and the output layer are fully connected, and a softmax function may be used as an activation function. In a process of model training, a data value is transferred by means of forward transfer, and a gradient value is transferred by means of backward transfer.

In some possible embodiments, an evaluation value is indicated as Q (s,a). A state s indicates service data traffic and CSI in a current DRX period, an action a indicates a DRX mode configured by a base station for user equipment, each Q value indicates a future long-term value brought by selecting a certain action a in the state s, and a level of the Q value measures whether an action is selected.

Hyper-parameters of the neural network model may be set by the following method. T learning rounds may be set, and setting of the learning rounds needs to measure an influence of a model training speed, training cost and model training accuracy; a learning rate may be set as a; a reward attenuation can be set as γ; and random weight initialization is selected as a method for weight initialization.

In a possible embodiment, a process of training a neural network model on the basis of sample data includes the following steps 1 to 4.

Step 1, use service data traffic and CSI of a first DRX period in the sample data as a DRX mode selected by an initial state $s^1$ as an action $a^1$, and obtain a corresponding Q value Q ($s^1$, $a^1$).

Step 2, compute index values such as energy consumption of user equipment in the state according to the CSI of the first DRX period in the sample data and the selected DRX mode, and generating a reward value R from the index values.

When energy consumption of the user equipment is computed, each time slot in the DRX period may be considered as an object of study, a signal-to-noise ratio may be computed by means of the CSI, and a modulation and coding mode may be further obtained to compute the number of time slots required for transmission of a data packet. According to a state (sleep state, on state, inactivity state, etc.) of a current time slot, corresponding work is executed, such as PDCCH monitoring in the on state, data reception or continued monitoring of a PDCCH in the inactivity state, and no PDCCH monitoring or data reception in the sleep state. Whether states are converted is determined according to whether a timer expires, such as conversion from the ON state to the inactivity state, and conversion from the inactivity state to the sleep state, and energy consumption is computed according to the state of each time slot; and finally, the energy consumption of the time slots is summed to obtain the energy consumption E in one DRX period. According to the computed energy consumption E, obtain a reward value R: R=CE, where c indicates a scaling factor for converting energy consumption into the reward value.

Step 3, find a maximum Q value Q ($s^2$, $a^2$) in Q values corresponding to different actions according to a state s' of a next DRX period in sample data, i.e., Q ($s^2$, $a^2$)=$\max_a$·Q (s', a') and compute a loss function to be optimized according to Q ($s^2$, $a^2$). Loss=R+γ Q ($s^2$, $a^2$)−Q ($s^1$, $a^1$), where γ is a reward attenuation, R is a reward value, and Q ($s^1$, $a^1$) is a current Q value; and train a model according to the computed loss function, where a stochastic gradient descent (SGD) method may be used as the specific manner of updating parameters.

Step 4, in a next iteration, repeat steps 1-4 by using $s'=s^2$ as a current state until training is successful.

Since the historical data includes data of T consecutive DRX periods, (T−1) rounds of training is performed in total until training is completed.

In the example of the disclosure, different DRX modes are set in order to adapt to different service traffic situations. The base station obtains the deep learning model, inputs the service data traffic and the CSI of the user equipment in the current DRX period into the deep learning model, selects the DRX mode corresponding to a maximum evaluation value from evaluation values of N DRX modes output by the deep learning model, and notifies the user equipment of the selected DRX mode. A corresponding relation between a service data transmission situation and the evaluation value corresponding to the DRX mode is trained on the basis of the deep learning model to obtain the successfully trained deep learning model, and the DRX mode most suitable for a current application situation is adaptively selected on the basis of the successfully trained deep learning model such that the DRX mode can be automatically adjusted according to the service data transmission situation. Thus, reducing power consumption of the user equipment, improving an energy-saving effect, and maintaining effective balance between the energy-saving effect and service quality.

A method for transmitting indication information is provided in an example of the disclosure. The method is performed by a base station. The method includes: obtain the deep learning model by training sample data; or, receive the deep learning model from a server, where the deep learning model is obtained by training sample data; input the service data traffic and the CSI of the user equipment in the current DRX period into the deep learning model, determine N evaluation values output by the deep learning model, and determine a DRX mode corresponding to a maximum evaluation value of the N evaluation values; and transmit first indication information to the user equipment, where the first indication information is used to indicate the DRX mode.

In the example of the disclosure, the DRX mode is determined on the basis of the same fixed deep learning model in each DRX period.

The examples will be described in detail below by means of two examples.

In a first example, a training process is executed by a base station, and a successfully trained deep learning model is obtained.

A method for transmitting indication information is provided in the first example. The method is performed by a base station. The method includes the following steps.

Step 1, obtain a deep learning model by training sample data in a T-th DRX period, where T is an integer greater than 1.

Step 2, input service data traffic and CSI of user equipment in the T-th DRX period into the deep learning model, determine N evaluation values output by the deep learning model, and determine a DRX mode corresponding to a maximum evaluation value in N evaluation values.

Step 3, transmit first indication information to the user equipment in the T-th DRX period, where the first indication information is used to indicate the DRX mode, where the DRX mode indicated by the first indication information is the DRX mode determined in step 2.

Step 4, input service data traffic and CSI of the user equipment in a (T+1)-th DRX period into the deep learning model in the (T+1)-th DRX period, determine N evaluation values output by the deep learning model, and determine a DRX mode corresponding to a maximum evaluation value in N evaluation values.

Step 5, transmit first indication information to the user equipment in the (T+1)-th DRX period, where the first indication information is used to indicate the DRX mode, and the DRX mode indicated by the first indication information is the DRX mode determined in step 4; and so on, where in each subsequent DRX period, a DRX mode in a corresponding DRX period is determined on the basis of the deep learning model, and the user equipment is notified of the DRX mode on the basis of the first indication information.

In a second example, a training process is executed by a server, and a successfully trained deep learning model is obtained.

A method for transmitting indication information is provided in the second example. The method is performed by a base station. The method includes the following steps.

Step 1, receive a deep learning model from a server in a T-th DRX period, where the deep learning model is obtained by training sample data, and T is an integer greater than 1.

Step 2, input service data traffic and CSI of user equipment in the T-th DRX period into the deep learning model, determine N evaluation values output by the deep learning model, and determine a DRX mode corresponding to a maximum evaluation value in N evaluation values.

Step 3, transmit first indication information to the user equipment in the T-th DRX period, where the first indication information is used to indicate the DRX mode, where the DRX mode indicated by the first indication information is the DRX mode determined in step 2.

Step 4, input service data traffic and CSI of the user equipment in a (T+1)-th DRX period into the deep learning model in the (T+1)-th DRX period, determine N evaluation values output by the deep learning model, and determine a DRX mode corresponding to a maximum evaluation value in N evaluation values.

Step 5, transmit first indication information to the user equipment in the (T+1)-th DRX period, where the first indication information is used to indicate the DRX mode, and the DRX mode indicated by the first indication information is the DRX mode determined in step 4; and so on, where in each subsequent DRX period, a DRX mode in a corresponding DRX period is determined on the basis of the deep learning model, and the user equipment is notified of the DRX mode on the basis of the first indication information.

A method for transmitting indication information is provided in an example of the disclosure. The method is performed by a base station. The method includes: obtaining historical data of the user equipment in latest M consecutive DRX periods in the current DRX period; or, obtain historical data of the user equipment in latest M consecutive DRX periods when the current DRX period corresponds to an update opportunity, where the update opportunity corresponds to execution of one model update every K DRX periods, K and M are integers greater than 1, and K is greater than or equal to M; and the historical data includes historical parameters of the user equipment in the M consecutive DRX periods, where the historical parameters include the service data traffic, the CSI, a selected DRX mode, and evaluation values corresponding to N DRX modes; obtaining the deep learning model according to the historical data of the user equipment in the M consecutive DRX periods; inputting the service data traffic and the CSI of the user equipment in the current DRX period into the deep learning model, determining N evaluation values output by the deep learning model, and determine a DRX mode corresponding to a maximum evaluation value of the N evaluation values; and transmitting first indication information to the user equipment, where the first indication information is used to indicate the DRX mode.

In some possible embodiments, the step of obtaining the deep learning model according to the historical data of the user equipment in the M consecutive DRX periods includes:

obtain, by a base station, the deep learning model by updating a first model according to the historical data of the user equipment in the M consecutive DRX periods, where the first model is a model obtained by training sample data, or, the first model is a model obtained by training sample data and the historical data of the user equipment in the M consecutive DRX periods in a set historical period.

In some possible embodiments, the step of obtaining the deep learning model according to the historical data of the user equipment in the M consecutive DRX periods includes: transmitting the historical data of the user equipment in the M consecutive DRX periods to the server, and receiving the deep learning model from the server. Where the deep learning model is obtained by updating a first model on the basis of the historical data of the user equipment in the M consecutive DRX periods; and the first model is a model obtained by training sample data, or, the first model is a model obtained by training sample data and the historical data of the user equipment in the M consecutive DRX periods in a set historical period.

In the example of the disclosure, the deep learning model is updated on the basis of the historical data of the user equipment in the M consecutive DRX periods, such that the deep learning model tracks and learns latest real historical data of the user equipment, output of the deep learning model is more intelligent and accurate, and generalization performance of the model is improved.

The examples will be described in detail below by means of two examples.

In a first example, a deep learning model is updated once every K DRX periods. In the first example, a method for transmitting indication information is provided. The method is performed by a base station. The method includes the following steps.

Step 1, receive a deep learning model from a server in a T-th DRX period, where input data of the deep learning model includes service data traffic and CSI in the DRX period, output data is N evaluation values, each evaluation value corresponds to a DRX mode, and N is an integer greater than 1; and the deep learning model received from the server is obtained by training a sample set.

Step 2, input the service data traffic and the CSI of the user equipment in the T-th DRX period into the deep learning model in the T-th DRX period, so as to obtain an output result of the deep learning model, where the output result is N evaluation values, and determine a DRX mode corresponding to a maximum evaluation value of the N evaluation values; and transmit first indication information to the user equipment in the T-th DRX period, where the first indication information is used to indicate the DRX mode.

Step 3, input service data traffic and CSI in a corresponding DRX period into the deep learning model in each DRX period from a (T+1)-th DRX period to a (T+K−1)-th DRX period, so as to obtain an output result of the deep learning model, where the output result is N evaluation values, determine a DRX mode corresponding to a maximum evaluation value in N evaluation values, and transmit first indication information to the user equipment in the corresponding DRX period, where the first indication information is used to indicate the DRX mode determined.

Step 4, obtain historical data of the user equipment in latest M consecutive DRX periods in a (T+K)-th DRX period, where the historical data includes historical parameters of the user equipment in latest M consecutive DRX periods, and the historical parameters include the service data traffic, the CSI, a selected DRX mode and evaluation values corresponding to N DRX modes, K and M are integers greater than 1, and K is equal to or greater than M; transmit the historical data of the user equipment in the M consecutive DRX periods to the server; receive an updated deep learning model from the server; and input the service data traffic and the CSI of the user equipment in the (T+K)-th DRX period into the updated deep learning model in the (T+K)-th DRX period, determine N evaluation values output by the updated deep learning model, and determine a DRX mode corresponding to a maximum evaluation value in N evaluation values; and transmit first indication information to the user equipment, where the first indication information is used to indicate the DRX mode.

Step 5, input service data traffic and CSI in a current DRX period into the deep learning model obtained in step 4 in each DRX period from a (T+K+1)-th DRX period to a (T+2K−1)-th DRX period, so as to obtain an output result, where the output result is N evaluation values, determine a DRX mode corresponding to a maximum evaluation value in N evaluation values, and transmit first indication information to the user equipment in the current DRX period, where the first indication information is used to indicate the DRX mode determined.

Step 6, obtain historical data of the user equipment in latest M consecutive DRX periods in a (T+2K)-th DRX period, and transmit the historical data of the user equipment in latest M consecutive DRX periods to the server; receive an updated deep learning model from the server; and input service data traffic and CSI of the user equipment in the (T+2K)-th DRX period into the updated deep learning model in the (T+2K)-th DRX period, determine N evaluation values output by the updated deep learning model, and determine a DRX mode corresponding to a maximum evaluation value in N evaluation values; and transmit first indication information to the user equipment, where the first indication information is used to indicate the DRX mode; and so on, where the deep learning model is updated once every K DRX periods, and the DRX mode is determined on the basis of latest updated deep learning model in each DRX period between two updates.

In some possible embodiments, the updated deep learning model in step 4 is obtained by the server after the historical data of the user equipment in the previous M consecutive DRX periods in a cycle process is trained on the basis of the deep learning model in step 1 in the example of the disclosure.

In some possible embodiments, the updated deep learning model in step 4 is obtained by the server after the historical data of the user equipment in latest M consecutive DRX cycles is trained on the basis of the deep learning model in step 1 in the example of the disclosure.

In a second example, the deep learning model is updated once every one DRX period. In the second example, a method for transmitting indication information is provided. The method is performed by a base station. The method includes the following steps.

Step 1, receive a deep learning model from a server in a T-th DRX period, where input data of the deep learning model includes service data traffic and CSI in the DRX period, output data is N evaluation values, each evaluation value corresponds to a DRX mode, and N is an integer greater than 1; and the deep learning model received from the server is obtained by training a sample set.

Step 2, input the service data traffic and the CSI of the user equipment in the T-th DRX period into the deep learning model in the T-th DRX period, so as to obtain an output result of the deep learning model, where the output result is N evaluation values, and determine a DRX mode corresponding to a maximum evaluation value of the N evaluation values; and transmit first indication information to the user equipment in the T-th DRX period, where the first indication information is used to indicate the DRX mode.

Step 3, obtain historical data of the user equipment in latest M consecutive DRX periods in a (T+1)-th DRX period, and transmit the historical data of the user equipment in the M consecutive DRX periods to the server; receive an updated deep learning model from the server, input service data traffic and CSI of the user equipment in the (T+1)-th DRX period into the updated deep learning model in the (T+1)-th DRX period, determine N evaluation values output by the updated deep learning model, and determine a DRX mode corresponding to a maximum evaluation value in N evaluation values; and transmit first indication information to the user equipment, where the first indication information is used to indicate the DRX mode.

Step 4, obtain historical data of the user equipment in latest M consecutive DRX periods in a (T+2)-th DRX period, and transmit the historical data of the user equipment in the M consecutive DRX periods to the server; receive an updated deep learning model from the server, input service data traffic and CSI of the user equipment in the (T+2)-th DRX period into the updated deep learning model in the (T+2)-th DRX period, determine N evaluation values output by the updated deep learning model, and determine a DRX mode corresponding to a maximum evaluation value in N evaluation values; and transmit first indication information to the user equipment, where the first indication information is used to indicate the DRX mode; and so on, where the deep learning model is updated once every one DRX period, and the DRX mode is determined on the basis of the updated deep learning model in a corresponding DRX period in each DRX period.

A method for transmitting indication information is provided in an example of the disclosure. The method is performed by a base station. The method includes: transmitting a request message to an OAM entity, where the request message is used to request the historical data of the user equipment in the M consecutive DRX periods to be obtained; receive a second indication message from the OAM entity, where the second indication message is used to indicate that data is ready and indicate a first address, and the first address is an address used to store the historical data of the user equipment in the M consecutive DRX periods; and obtaining the historical data of the user equipment in the M consecutive DRX periods from the first address; obtaining a deep learning model according to the historical data of the user equipment in the M consecutive DRX periods; inputting the service data traffic and the CSI of the user equipment in the current DRX period into the deep learning model, determine N evaluation values output by the deep learning model, and determining a DRX mode corresponding to a maximum evaluation value of the N evaluation values; and transmitting first indication information to the user equipment, where the first indication information is used to indicate the DRX mode.

In a possible embodiment, a subscribe request is transmitted to an OAM entity. The subscribe request includes identification information of user equipment and request information used to obtain historical data of the user equipment in M consecutive DRX periods. After receiving the subscribe request transmitted by a base station, the OAM entity determines whether the base station has successfully subscribed to data requested by the base station. If the base station has successfully subscribed to the data, the OAM entity starts to prepare the data to which the base station has subscribed. If the base station does not successfully subscribe to the data, the OAM entity does not prepare the data. After preparing a data file, the OAM entity transmits second indication information to the base station. The second indication message is used to indicate that data is ready and indicate a first address, and the first address is an address used to store historical data of the user equipment in the M consecutive DRX periods.

Figure 3:
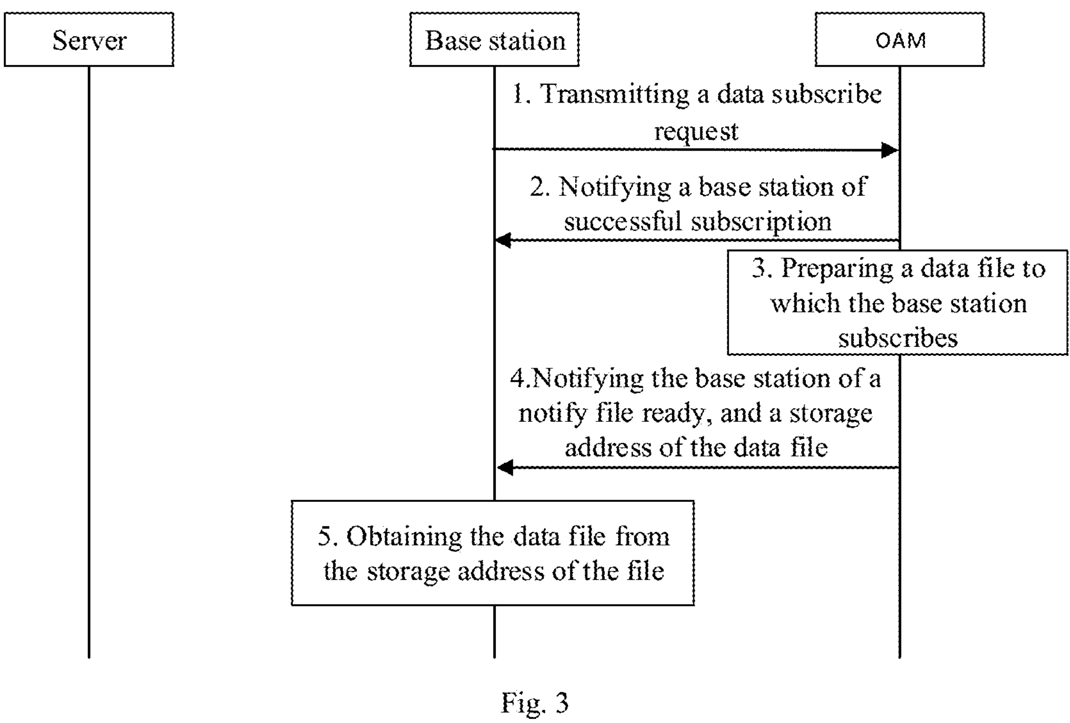
FIG. 3 is a flow chart of a method for a base station to obtain historical data of user equipment in M consecutive discontinuous reception periods according to an example.

In an example, as shown in FIG. 3, the step of obtaining historical data of the user equipment in the latest M consecutive DRX periods includes the following steps.

Step 1, a base station transmits a data subscription data to an OAM entity, and notifies information such as identity (ID) of the user equipment to be obtained. A data subscribe request is transmitted to the OAM entity to request historical data of the ID of the user equipment in latest consecutive M DRX periods to be obtained.

Step 2, the OAM entity receives the subscribe request transmitted by the base station, and determines whether the base station may subscribe to data of the user equipment.

If the base station successfully subscribes to data, the OAM entity notifies the base station of successful subscription; and if the base station does not successfully subscribe to data, the OAM entity notifies the base station of unsuccessful subscription.

Step 3, after the base station is notified, the OAM entity starts to prepare a data file to which the base station subscribes and looks for corresponding data according to the ID of the user equipment under the condition that the base station successfully subscribes to the data; and the OAM entity does not prepare the data under the condition that the base station does not successfully subscribe to the data.

Step 4, the OAM entity prepares the data file, notifies the base station that the data file is ready (e.g. by means of transmitting a NotifyFileReady message), and informs the base station of a storage address of the data file.

Step 5, the base station receives the NotifyFileReady message transmitted by the OAM entity, obtains the data file from the storage address of the file by means of a file transfer protocol (FTP), and stores the data file.

A method for transmitting indication information is provided in an example of the disclosure. The method is performed by a base station. The method includes: transmitting the request message to the OAM entity once every M DRX periods, where the request message is used to request the historical data of the user equipment in the M consecutive DRX periods to be obtained; receiving a second indication message from the OAM entity, where the second indication message is used to indicate that data is ready and indicate a first address, and the first address is an address used to store the historical data of the user equipment in the M consecutive DRX periods; and obtain the historical data of the user equipment in the M consecutive DRX periods from the first address, where the historical data includes historical parameters of the user equipment in the M consecutive DRX periods, where the historical parameters include the service data traffic, the CSI, a selected DRX mode, and evaluation values corresponding to N DRX modes; obtaining a deep learning model according to the historical data of the user equipment in the M consecutive DRX periods; inputting the service data traffic and the CSI of the user equipment in the current DRX period into the deep learning model, determine N evaluation values output by the deep learning model, and determine a DRX mode corresponding to a maximum evaluation value of the N evaluation values; and transmitting first indication information to the user equipment, where the first indication information is used to indicate the DRX mode.

In the example of the disclosure, the deep learning model is updated once at a time interval of the M DRX periods, such that the deep learning model is continuously updated according to real-time data of the user equipment, thus continuously improving accuracy of the deep learning model.

A method for transmitting indication information is provided in an example of the disclosure. The method is performed by a base station. The method includes: determining a DRX mode of user equipment according to service data traffic and CSI of the user equipment in a current DRX period; and transmitting downlink control information (DCI) to the user equipment through a physical downlink control channel (PDCCH), where the DCI includes the first indication information, and the first indication information is used to indicate the DRX mode.

In some possible embodiments, before the step of transmitting DCI to the user equipment through a PDCCH, the method further includes: transmit, by a base station, a radio resource control setup (e.g. RRCSetup) signaling or an RRC reestablishment (e.g. RRCReestablishment) instruction to the user equipment, which is used to request the user equipment to establish or re-establish an RRC connection. RRC setup indicates establishment of the RRC connection, and RRC reestablishment indicates re-establishment of the RRC connection. After receiving the signaling, the user equipment transmits a signaling of RRC setup complete (e.g. RRCSetupComplete) or a signaling of RRC reestablishment complete (e.g. RRCReestablishmentComplete) to the base station. RRC setup complete indicates completion of establishment of the RRC connection, and RRC reestablishment complete indicates completion of reestablishment of the RRC connection.

A method for transmitting indication information is provided in an example of the disclosure. The method is performed by a base station. The method includes: determining a DRX mode of user equipment according to service data traffic and CSI of the user equipment in a current DRX period; and transmitting a reference signal to the user equipment through a physical downlink share channel (PDSCH), where the reference signal includes the first indication information.

A method for transmitting indication information is provided in an example of the disclosure. The method is performed by a base station. The method includes: determining a DRX mode of user equipment according to service data traffic and CSI of the user equipment in a current DRX period; and transmitting media access control-control element (MAC-CE) information to the user equipment through a PDSCH, where the MAC-CE information includes the first indication information.

A method for transmitting indication information is provided in an example of the disclosure. The method is performed by a base station. The method includes: determining a DRX mode of user equipment according to service data traffic and CSI of the user equipment in a current DRX period; and transmitting first indication information and third indication information to the user equipment, where the first indication information is used to indicate the DRX mode, and the third indication information is used to indicate that the DRX mode corresponds to a mode of waking up a user or a mode of not waking up a user.

In some possible embodiments, DCI is transmitted to user equipment through a PDCCH. The DCI includes first indication information and third indication information. The first indication information is used to indicate a DRX mode, and the third indication information is used to indicate that the DRX mode corresponds to a mode of waking up a user or a mode of not waking up a user.

In a possible embodiment, two DRX modes are included. A first DRX mode corresponds to a mode of waking up a user, and a second DRX mode corresponds to a mode of not waking up a user.

In a possible embodiment, DCI transmitted to the user equipment is DCI format 3-0, i.e., DCI format 3_0. The DCI format 3_0 includes a set bit occupying 1 bit. When a value of the set bit is 1, a mode of waking up a user is indicated. When a value of the set bit is 0, a mode of not waking up a user is indicated.

In a possible embodiment, a base station scrambles a cyclic redundancy check (CRC) field of DCI format 3_0 by means of a power saving radio network temporary identity (PS-RNTI), and then transmits the DCI carried on a PDCCH to user equipment.

In some possible embodiments, a reference signal is transmitted to user equipment through a PDSCH. The reference signal includes first indication information and third indication information. The first indication information is used to indicate a DRX mode, and the third indication information is used to indicate that the DRX mode corresponds to a mode of waking up a user or a mode of not waking up a user.

In some possible embodiments, MAC-CE information is transmitted to user equipment through a PDSCH. The MAC-CE information includes first indication information and third indication information. The first indication information is used to indicate a DRX mode, and the third indication information is used to indicate that the DRX mode corresponds to a mode of waking up a user or a mode of not waking up a user.

A method for transmitting indication information is provided in an example of the disclosure. The method is performed by a base station. The method includes: determining a DRX mode of user equipment according to service data traffic and CSI of the user equipment in a current DRX period; transmitting first indication information and third indication information to the user equipment, where the first indication information is used to indicate the DRX mode, and the third indication information is used to indicate that the DRX mode corresponds to a mode of waking up a user or a mode of not waking up a user; and transmitting an RRC signaling to the user equipment when the DRX mode corresponds to the mode of waking up a user, where the RRC signaling includes fourth indication information, where the fourth indication information is used to indicate a slot interval for detecting a PDCCH; and different DRX modes correspond to different slot intervals.

In some possible embodiments, the fourth indication information is: monitoring slot periodicity and an offset field in a search space information element in a control resource set in PDCCH configuration information in the RRC signaling.

In a possible embodiment, four DRX modes are included as shown in Table 1.

TABLE 1

| DRX mode | Whether to support a mode of waking up a user | PDCCH monitoring period |
|---|---|---|
| Mode 0 | No | None |
| Mode 1 | Yes | 1 time slot |
| Mode 2 | Yes | 2 time slots |
| Mode 3 | Yes | 4 time slots |

When a DRX mode corresponds to a mode of waking up a user, a PDCCH monitoring period needs to be configured, and monitoring slot periodicity and offset (e.g. MonitoringSlotPeriodicityAndOffset) in a search space information element needs to be configured, and is used to indicate how many slots PDCCH monitoring is performed once. There are a wide range of selectable options, three options sl1, sl2, and sl4 may be selected, and indicate that PDCCH monitoring is performed once in 1, 2, and 4 slots respectively, and the meaning of one slot is that PDCCH monitoring is performed in each slot, an objective of which is to reduce periodicity of the user equipment monitoring a PDCCH after the user equipment wakes up in order to save energy. Therefore, different configurations are selected according to different service traffic conditions. When traffic is large, a short periodicity is selected to monitor the PDCCH, and when traffic is small, a long periodicity is selected.

In combination with Table 1, a mode of not waking up a user is denoted as a DRX mode 0, a mode of waking up a user and a mode in which MonitoringSlotPeriodicityAndOffset is set as sl1 are denoted as a DRX mode 1, the mode of waking up a user and a mode in which MonitoringSlotPeriodicityAndOffset is set as sl2 are denoted as a DRX mode 2, and a mode of waking up a user and a mode in which MonitoringSlotPeriodicityAndOffset is set as sl4 are denoted as a DRX mode 3.

In some possible embodiments, user equipment monitors a PDCCH carrying a wake-up signal (WUS) in a period of time after PS_offset (upper layer parameter configuration). The user equipment receives the PDCCH if the user equipment monitors the PDCCH. The user equipment decodes DCI format 3_0 data scrambled by PS-RNTI, obtains DRX mode information according to data of a field corresponding to DRX mode, and executes a corresponding DRX mechanism.

The user equipment executes different DRX mechanisms according to the indicated DRX mode information.

If information obtained by the user equipment indicates the mode of not waking up a user, the user equipment does not execute PDCCH monitoring and data reception in a next DRX period, and stays in a sleep state.

If information obtained by the user equipment indicates the mode of waking up a user, the user equipment enters a DRX ON state in a next DRX period, starts to monitor the PDCCH, and opens an inactivity timer to receive data and enters an inactivity state when scheduled data arrives. Moreover, the user equipment obtains a PDCCH monitoring period according to an RRC signaling, determines the PDCCH monitoring period of the DRX ON state and the inactivity state, and executes a corresponding mechanism.

Figure 4:
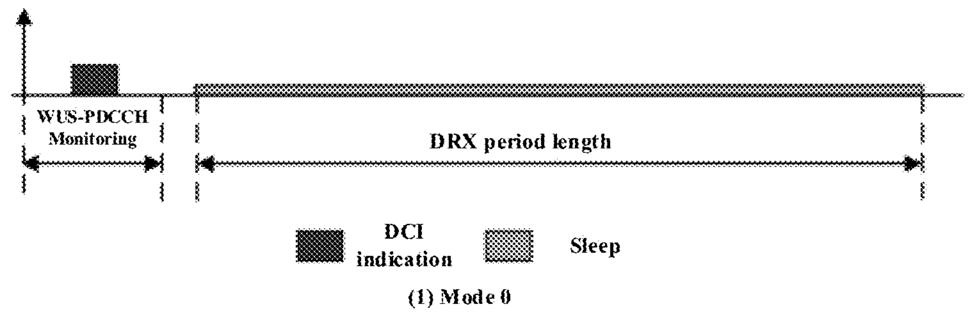
FIG. 4 is a schematic diagram of a discontinuous reception method for a discontinuous reception mode 0 according to an example.

As shown in FIG. 4, for a DRX mode 0, before a DRX period starts, user equipment receives DCI format 3_0 information transmitted by a base station, and the DCI indicates that the user equipment enters the DRX mode 0. In a next DRX period, the user equipment enters a sleep state, does not open a DRX-ON duration timer, and does not monitor a PDCCH and receive data until the DRX period ends.

Figure 5:
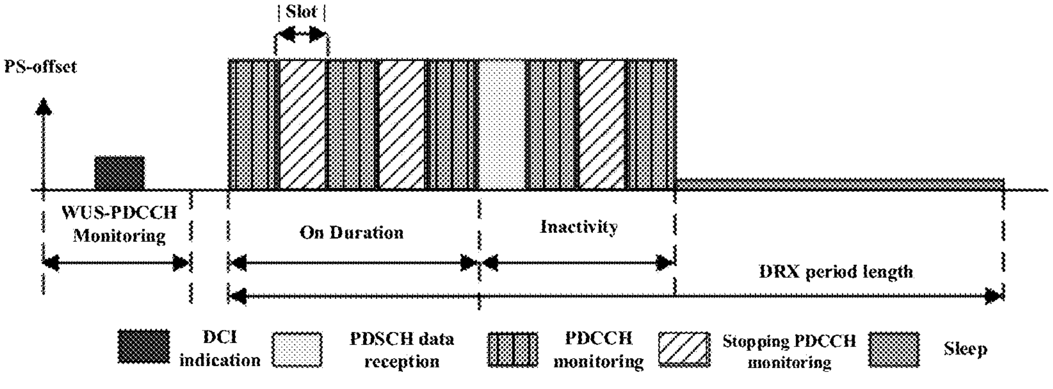
FIG. 5 is a schematic diagram of a discontinuous reception method for a discontinuous reception mode 1/2/3 according to an example.

As shown in FIG. 5, for DRX modes 1/2/3, before a DRX period starts, user equipment receives DCI format 3_0 information transmitted by a base station, and DCI indicates that the user equipment enters a certain mode. In a next DRX period, the user equipment starts a DRX-ON duration timer and enters a DRX ON state, during which the user equipment continuously monitors a PDCCH. If the user equipment monitors that scheduled data is transmitted to the user equipment, the user equipment opens a DRX-inactivity timer, enters a DRX inactivity state from the DRX ON state, starts to receive data on a PDSCH, and resets the DRX-inactivity timer when new data arrives until when the DRX-inactivity timer expires, the user equipment re-enters the DRX ON state and continuously monitors the PDCCH until the DRX-ON duration timer expires, and enters a sleep state until the DRX period ends. During the entire DRX period, the user equipment monitors the PDCCH according to a PDCCH monitoring period determined in the received RRC signaling.

In another embodiment, user equipment enters a DRX inactivity state from a DRX ON state, starts to receive data on a PDSCH, and resets a DRX-inactivity timer when new data arrives, and the user equipment may use a long DRX period when a DRX-inactivity timer expires or receives DRX command MAC control element. If a user uses the long DRX period and a frame numb single frequency network (SFN) and a subframe number satisfy a set condition, the user opens the DRX-ON duration timer. In an example, a set condition is as follows: [(SFN×10)+subframe number] modulo (drx-Long Cycle)=drx-Start Offset.

A method for transmitting indication information is provided in an example of the disclosure. The method is performed by a base station. The method includes: inputting the service data traffic and the CSI of the user equipment in the current DRX period into a deep learning model, determine N evaluation values output by the deep learning model, and determine a DRX mode corresponding to a maximum evaluation value of the N evaluation values; transmitting first indication information to the user equipment, where the first indication information is used to indicate the DRX mode; constructing historical data of the user equipment in the current DRX period after the current DRX ends, and transmitting the historical data of the user equipment in the current DRX period to the OAM entity. Where the historical data in the current DRX period includes the service data traffic, the CSI, a selected DRX mode, and evaluation values corresponding to the DRX mode.

In some possible embodiments, the step of constructing historical data of the user equipment in the current DRX period after the current DRX ends, and transmitting the historical data of the user equipment in the current DRX period to the OAM entity includes: a base station counting service data traffic transmitted to the user equipment by a network side via the base station in the current DRX period; the base station receiving CSI periodically reported by the user equipment through a PUCCH to determine CSI in the current DRX period; the base station recording a DRX mode notified to the user equipment; the base station recording an evaluation value corresponding to the DRX mode; the base station constructing service data traffic, CSI, a selected DRX mode and evaluation values corresponding to the DRX mode of the user equipment in the current DRX period as historical data of the user equipment in the current DRX period; transmitting the historical data of the user equipment in the current DRX period to an OAM entity, such that the OAM entity stores the historical data in the current DRX period; and the OAM entity receives the historical data transmitted by the base station in the current DRX period, the OAM entity creates a new record indicating the historical data in the current DRX period, and storing each item of data in the historical data correspondingly, to form a complete historical data record.

In the example of the disclosure, after each DRX period ends, the base station transmits the historical data of the user equipment in the current DRX period to the OAM entity, so as to facilitate a subsequent update process of the model.

The examples will be described in detail below by means of two specific examples.

Example 1

Figure 6:
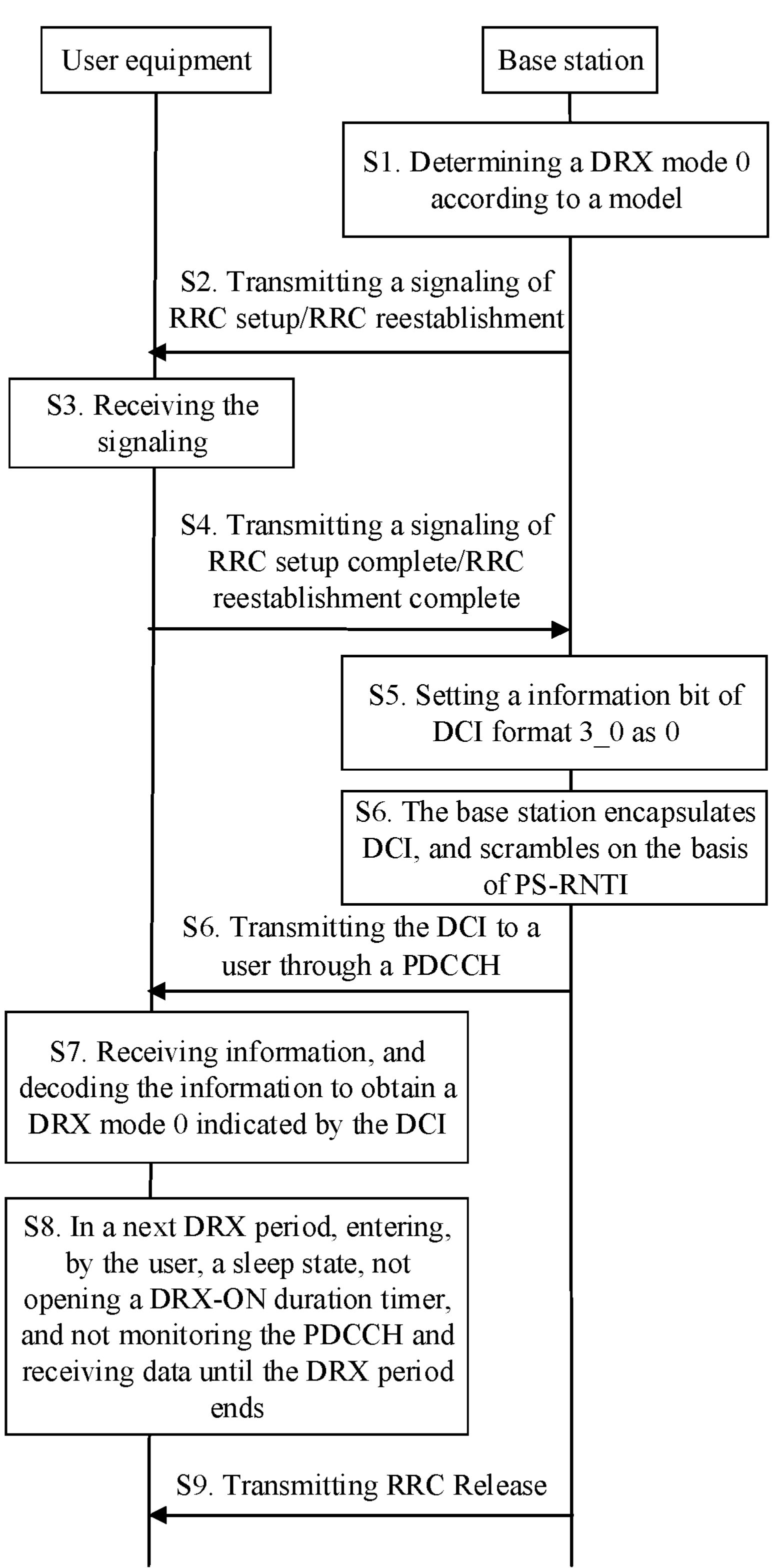
FIG. 6 is a flow chart of a method for a base station to instruct user equipment to execute discontinuous reception according to an example.

As shown in FIG. 6, a method for a base station to instruct user equipment to execute DRX includes Steps S1-S9.

In step S1, a base station determines a DRX mode on the basis of a deep learning model, and determines a mode number as mode 0.

In step S2, the base station establishes an RRC connection to user equipment, and transmits a signaling of RRC setup/RRC reestablishment (e.g. RRCSetup/RRCReestablishment) to the user equipment In step S3, the user equipment receives the signaling establishing or reestablishing the RRC connection transmitted by the base station.

In step S4, the user equipment executes establishment or reestablishment of the RRC connection, and transmits a signaling of RRC setup complete/RRC reestablishment complete (e.g. RRCSetupComplete/RRCReestablishment-Complete) to the base station.

In step S5, the base station carries information on DCI format 3_0 according to the selected DRX mode number, and sets an information bit of the DCI format 3_0 as 0.

In step S6, the base station encapsulates DCI, scrambles the CRC on the basis of PS-RNTI, and transmits the CRC to the user equipment through a PDCCH.

In step S7, the user equipment receives the DCI, decodes the DCI to obtain information carried, and determines a DRX mode 0.

In step S8, the user equipment executes a DRX mechanism, the user equipment enters a sleep state in a next DRX period, does not open a DRX-ON duration timer, and does not monitor a PDCCH and receive data until the DRX period ends.

In step S9, the base station transmits a signaling of RRC Release to the user equipment.

Example 2

Figure 7:
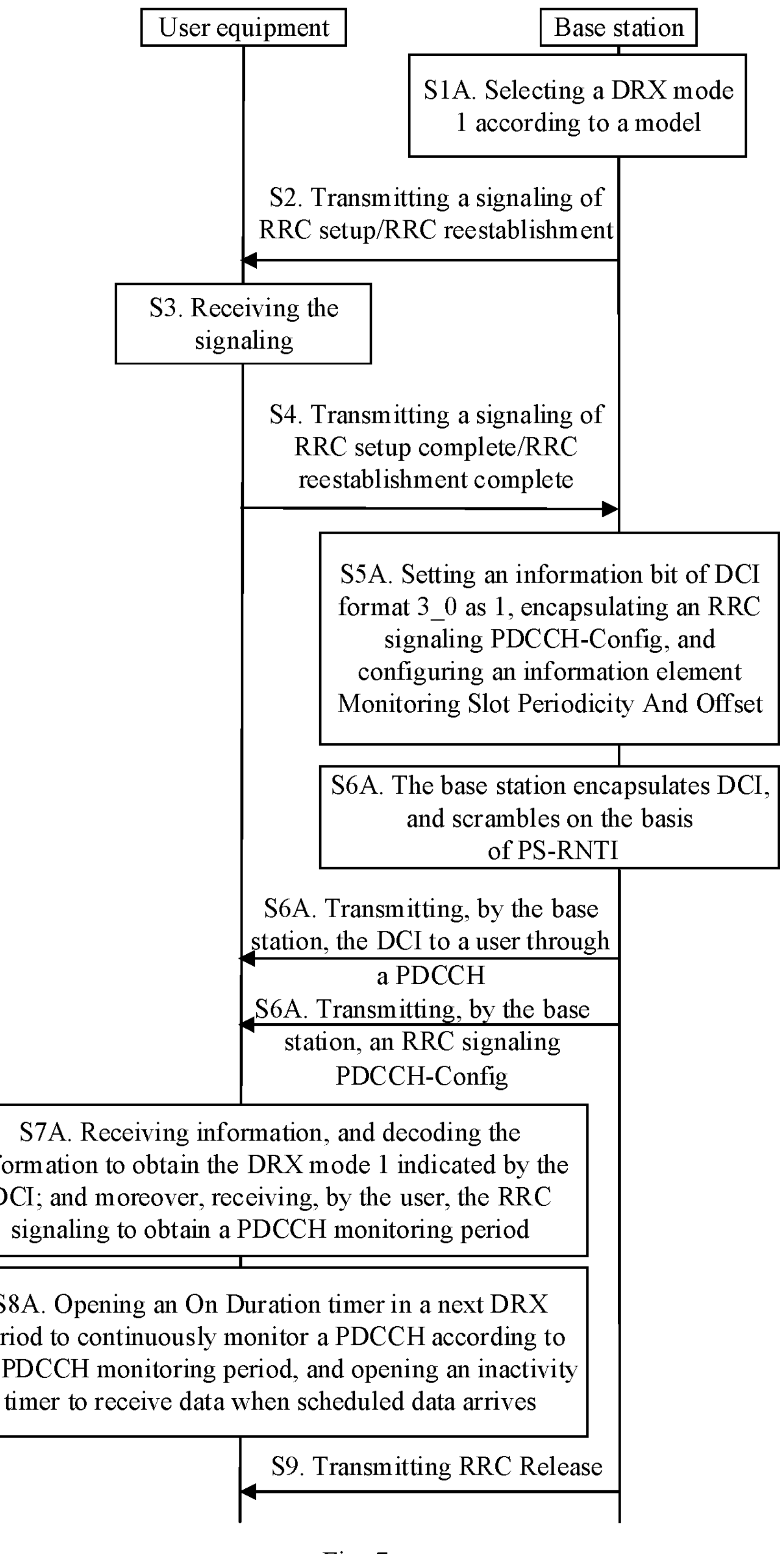
FIG. 7 is a flow chart of a method for a base station to instruct user equipment to execute discontinuous reception according to an example

As shown in FIG. 7, a method for a base station to instruct user equipment to execute DRX includes steps S1A-S9.

In step S1A, a base station determines a DRX mode on the basis of a deep learning model, and determines a mode number as mode 1.

In step S2, the base station establishes an RRC connection to user equipment, and transmits a signaling of RRC setup/RRC reestablishment (e.g. RRCSetup/RRCReestablishment) to the user equipment.

In step S3, the user equipment receives the signaling of RRC setup/RRC reestablishment transmitted by the base station.

In step S4, the user equipment executes establishment or reestablishment of the RRC connection, and replies to a signaling of RRC setup complete/RRC reestablishment complete (e.g. RRCSetupComplete/RRCReestablishment-Complete) by the base station.

In step S5A, the base station carries information on DCI format 3_0 according to the selected DRX mode, and sets an information bit of the DCI format 3_0 as 1; and moreover, the base station encapsulates an RRC signaling PDCCH-config, where a value of an information element MonitoringSlotPeriodicityAndOffset is set as sl1 according to the selected DRX mode.

In step S6A, the base station encapsulates DCI, scrambles the CRC on the basis of PS-RNTI, and transmits the CRC to the user equipment through a PDCCH; and moreover, the base station transmits an encapsulated RRC signaling PDCCH-config to the user equipment.

In step S7A, the user equipment receives the DCI, decodes the DCI to obtain information carried, and determines a DRX mode; and moreover, the user equipment receives the RRC signaling PDCCH-config to obtain a PDCCH monitoring period.

In step S8A, the user equipment executes a DRX mechanism according to the DRX mode, the user equipment opens an ON duration timer in a next DRX period, continuously monitors the PDCCH according to a PDCCH monitoring period, and opens an inactivity timer to receive data when scheduled data arrives.

In step S9, the base station transmits a signaling of RRC Release to the user equipment.

In other examples, when a mode number is mode 2 or mode 3, the process is the same as the process corresponding to the mode number being mode 1 shown in FIG. 7, which is not repeated here.

A method for transmitting indication information is provided in an example of the disclosure. The method is performed by user equipment. The method includes: receiving first indication information from a base station, where the first indication information is used to indicate a DRX mode; and executing DRX according to the DRX mode.

A method for transmitting indication information is provided in an example of the disclosure. The method is performed by user equipment. The method includes: receiving DCI from the base station through a PDCCH, where the DCI includes the first indication information; and executing DRX according to the DRX mode.

A method for transmitting indication information is provided in an example of the disclosure. The method is performed by user equipment. The method includes receiving a reference signal from the base station through a PDSCH, where the reference signal includes the first indication information; and executing DRX according to the DRX mode.

In some possible embodiments, the step of receiving a reference signal from the base station through a PDSCH includes: receiving and parsing position information corresponding to the reference signal obtained, and obtaining first indication information from a position corresponding to the PDSCH according to the position information.

A method for transmitting indication information is provided in an example of the disclosure. The method is performed by user equipment. The method includes: receiving MAC-CE information from the base station through a PDSCH, where the MAC-CE information includes the first indication information, and executing DRX according to the DRX mode.

In some possible embodiments, the step of receiving MAC-CE information from the base station through a PDSCH includes: receiving and parsing position information corresponding to the MAC-CE information obtained, and obtaining first indication information from a position corresponding to the PDSCH according to the position information.

A method for transmitting indication information is provided in an example of the disclosure. The method is performed by user equipment. The method includes: receiving first indication information and third indication information from the base station, where the first indication information is used to indicate a DRX mode, and the third indication information is used to indicate that the DRX mode corresponds to a mode of waking up a user or a mode of not waking up a user; and executing DRX according to the DRX mode.

A method for transmitting indication information is provided in an example of the disclosure. The method is performed by user equipment. The method includes: receiving first indication information and third indication information from the base station, where the first indication information is used to indicate a DRX mode, and the third indication information is used to indicate that the DRX mode corresponds to a mode of waking up a user or a mode of not waking up a user; receiving an RRC signaling from the base station when the DRX mode corresponds to the mode of waking up a user, where the RRC signaling includes fourth indication information, where the fourth indication information is used to indicate a slot interval for detecting a PDCCH; and different DRX modes correspond to different slot intervals; and execute DRX according to the DRX mode.

A method for transmitting indication information is provided in an example of the disclosure. The method is performed by a server. The method includes: transmitting a deep learning model to a base station; receiving historical data of user equipment in M consecutive DRX periods from the base station; obtaining the deep learning model by updating a first model on the basis of the historical data of the user equipment in the M consecutive DRX periods; and transmitting the deep learning model to the base station. Where the first model is a model obtained by training sample data, or, the first model is a model obtained by training sample data and the historical data of the user equipment in the M consecutive DRX periods in a set historical period.

In the example of the disclosure, the server assists the base station in completing part of complex computation tasks, i.e., updating parameters of the deep learning model by periodically utilizing the historical data of a user, and feeding back an updated model result to the base station, thus avoiding energy consumption caused by local training of the model by the user equipment, and being conducive to achievement of the goal of energy saving of a terminal.

A method for transmitting indication information is provided in an example of the disclosure. The method is performed by an OAM entity. The method includes: receiving a request message from a base station, where the request message is used to request historical data of user equipment in M consecutive DRX periods to be obtained; and transmitting a second indication message to the base station, where the second indication message is used to indicate that data is ready and indicate a first address, and the first address is an address used to store the historical data of the user equipment in the M consecutive DRX periods.

A method for transmitting indication information is provided in an example of the disclosure. The method is performed by an OAM entity. The method includes: receiving a request message from a base station once every M DRX periods, where the request message is used to request historical data of user equipment in the M consecutive DRX periods to be obtained; and transmitting a second indication message to the base station once every M DRX periods, where the second indication message is used to indicate that data is ready and indicate a first address, and the first address is an address used to store the historical data of the user equipment in the M consecutive DRX periods.

A method for transmitting indication information is provided in an example of the disclosure. The method is performed by an OAM entity. The method includes: receiving a request message from a base station once every M DRX periods, where the request message is used to request historical data of user equipment in the M consecutive DRX periods to be obtained; transmitting a second indication message to the base station once every M DRX periods, where the second indication message is used to indicate that data is ready and indicate a first address, and the first address is an address used to store the historical data of the user equipment in the M consecutive DRX periods; and receiving historical data of the user equipment in a current DRX period from the base station every one DRX period.

On the basis of the same concept as the method examples described herein, a communication apparatus is further provided in an example of the disclosure. The communication apparatus may have the functions of a base station 102 in the method examples described herein and may be used to execute the steps executed by the base station 102 according to the method examples described herein. The functions may be implemented by means of hardware, or may be implemented by software or hardware executing corresponding software. The hardware or software includes one or more modules corresponding to the functions described herein.

On the basis of the same concept as the method examples described herein, a communication apparatus is further provided in an example of the disclosure. The communication apparatus includes a processor and a memory, where the memory is used to store a computer program; and the processor is used to execute the computer program to implement the steps executed by a base station 102 according to the method examples described herein.

A computer-readable storage medium is further provided in an example of the disclosure. The computer-readable storage medium stores a computer program, where the instruction causes a computer to execute the steps executed by a base station 102 according to the method examples described herein when called and executed on the computer.

Figure 8:
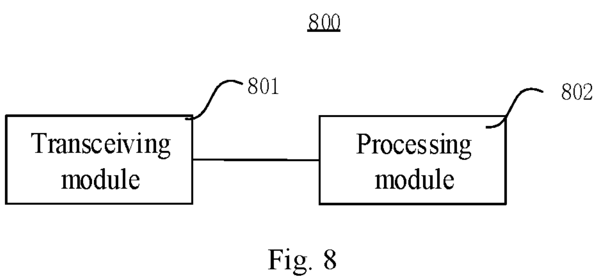
FIG. 8 is a structure diagram of an apparatus for transmitting indication information according to an example.

In a possible embodiment, a communication apparatus 800 shown in FIG. 8 may serve as a base station involved in the method examples described herein and execute the steps executed by the base station in the method examples described herein. As shown in FIG. 8, the communication apparatus 800 includes: a transceiving module 801 and a processing module 802, where the transceiving module 801 and the processing module 802 are at least communicatively coupled to each other. The transceiving module 801 may be used to support the communication apparatus 800 to perform communication. The transceiving module 801 may have a wireless communication function. For example, the transceiving module 801 may perform wireless communication with other communication apparatuses by means of a wireless radio. The processing module 802 may be used to support the communication apparatus 800 to execute processing actions in the method examples described herein, including, but not limited to, generating information and a message transmitted by the transceiving module 801, and/or demodulating and decoding a signal received by the transceiving module 801.

When the steps implemented by a base station 102 are executed, the processing module 802 is used to determine a DRX mode of user equipment according to service data traffic and CSI of the user equipment in a current DRX period. The transceiving module 801 is used to transmit first indication information to the user equipment, where the first indication information is used to indicate the DRX mode.

In an embodiment, the processing module 802 is further used to determine a DRX mode of the user equipment according to the service data traffic and the CSI of the user equipment in the current DRX period by the following method of inputting the service data traffic and the CSI of the user equipment in the current DRX period into a deep learning model, determining N evaluation values output by the deep learning model, and determining a DRX mode corresponding to a maximum evaluation value of the N evaluation values.

In an embodiment, the processing module 802 is further used to obtain the deep learning model by training sample data; or, the transceiving module 801 is used to receive the deep learning model from a server, where the deep learning model is obtained by training sample data.

In an embodiment, the processing module 802 is further used to obtain historical data of the user equipment in latest M consecutive DRX periods in the current DRX period; or, obtain historical data of the user equipment in latest M consecutive DRX periods when the current DRX period corresponds to an update opportunity; and obtain the deep learning model according to the historical data of the user equipment in the M consecutive DRX periods. Where the update opportunity corresponds to execution of one model update every K DRX periods, K and M are integers greater than 1, and K is greater than or equal to M; and the historical data includes historical parameters of the user equipment in the M consecutive DRX periods. Where the historical parameters include the service data traffic, the CSI, a selected DRX mode, and evaluation values corresponding to N DRX modes.

In an embodiment, the processing module 802 is further used to obtain the deep learning model by updating a first model according to the historical data of the user equipment in the M consecutive DRX periods; or, the transceiving module 801 is further used to transmit the historical data of the user equipment in the M consecutive DRX periods to the server, and receive the deep learning model from the server, where the deep learning model is obtained by updating a first model on the basis of the historical data of the user equipment in the M consecutive DRX periods; and the first model is a model obtained by training sample data, or, the first model is a model obtained by training sample data and the historical data of the user equipment in the M consecutive DRX periods in a set historical period.

In an embodiment, the transceiving module 801 is further used to transmit a request message to an OAM entity, where the request message is used to request the historical data of the user equipment in the M consecutive DRX periods to be obtained; receive a second indication message from the OAM entity, where the second indication message is used to indicate that data is ready and indicate a first address, and the first address is an address used to store the historical data of the user equipment in the M consecutive DRX periods; and obtain the historical data of the user equipment in the M consecutive DRX periods from the first address.

In an embodiment, the transceiving module 801 is further used to transmit the request message to the OAM entity once every M DRX periods.

In an embodiment, the transceiving module 801 is further used to transmit DCI to the user equipment through a PDCCH, where the DCI includes the first indication information.

In an embodiment, the transceiving module 801 is further used to transmit a reference signal to the user equipment through a PDSCH, where the reference signal includes the first indication information.

In an embodiment, the transceiving module 801 is further used to transmit MAC-CE information to the user equipment through a PDSCH, where the MAC-CE information includes the first indication information.

In an embodiment, the transceiving module 801 is further used to transmit third indication information to the user equipment, where the third indication information is used to indicate that the DRX mode corresponds to a mode of waking up a user or a mode of not waking up a user.

In an embodiment, the transceiving module 801 is further used to transmit an RRC signaling to the user equipment when the DRX mode corresponds to the mode of waking up a user, where the RRC signaling includes fourth indication information, where the fourth indication information is used to indicate a slot interval for detecting a PDCCH; and different DRX modes correspond to different slot intervals.

In an embodiment, the fourth indication information is: monitoring slot periodicity and an offset field in a search space information element in a control resource set in PDCCH configuration information in the RRC signaling.

In an embodiment, the transceiving module 801 is further used to construct historical data of the user equipment in the current DRX period after the current DRX period ends, and transmit the historical data of the user equipment in the current DRX period to the OAM entity, where the historical data in the current DRX period includes the service data traffic, the CSI, a selected DRX mode, and evaluation values corresponding to the DRX mode.

Figure 9:
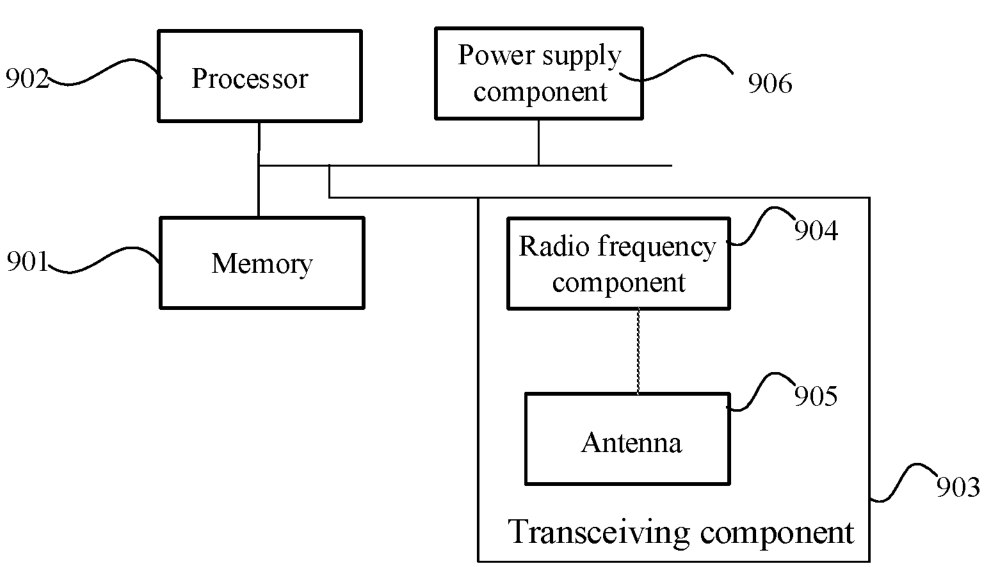
FIG. 9 is a structure diagram of another apparatus for transmitting indication information according to an example.

When the communication apparatus is a base station, the structure of the communication apparatus 900 may further be as shown in FIG. 9. The structure of the communication apparatus will be described by taking the base station as an example. As shown in FIG. 9, an apparatus 900 includes a memory 901, a processor 902, a transceiving component 903, and a power supply component 906. The memory 901 is coupled to the processor 902, and may be used to store a program and data necessary for implementing various functions of the communication apparatus 900. The processor 902 is configured to support the communication apparatus 900 to execute corresponding functions in the method described herein, and the functions may be implemented by calling the program stored in the memory 901. The transceiving component 903 may be a wireless transceiver, and may be used to support the communication apparatus 900 to receive a signaling and/or data and transmit the signaling and/or the data by means of a wireless radio. The transceiving component 903 may also be referred to as a transceiving unit or a communication unit. The transceiving component 903 may include a radio frequency component 904 and one or more antennas 905. The radio frequency component 904 may be a remote radio unit (RRU), and may be used to transmit a radio frequency signal and convert the radio frequency signal to a baseband signal. The one or more antennas 905 may be used to radiate and receive the radio frequency signal.

When the communication apparatus 900 needs to transmit data, the processor 902 may perform baseband processing on the data to be transmitted and output a baseband signal to the radio frequency unit, and the radio frequency unit performs radio frequency processing on the baseband signal and transmits the radio frequency signal in a form of an electromagnetic wave by means of the antenna. When the data is transmitted to the communication apparatus 900, the radio frequency unit receives the radio frequency signal by means of the antenna, converts the radio frequency signal into the baseband signal, and outputs the baseband signal to the processor 902, and the processor 902 converts the baseband signal into data and processes the data. Further, the structure provided by the communication apparatus 900 and its various components can perform the functions of at least the various modules described herein.

On the basis of the same concept as the method examples described herein, a communication apparatus is further provided in an example of the disclosure. The communication apparatus includes a processor and a memory, where the memory is used to store a computer program; and the processor is used to execute the computer program to implement the steps executed by the user equipment 101 according to the method examples described herein.

A computer-readable storage medium is further provided in an example of the disclosure. The computer-readable storage medium stores a computer program, where the instruction causes a computer to execute the steps executed by user equipment 101 according to the method examples described herein when called and executed on the computer.

Figure 10:
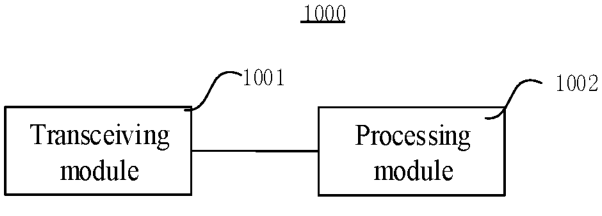
FIG. 10 is a structure diagram of another apparatus for transmitting indication information according to an example.

In a possible embodiment, a communication apparatus 1000 shown in FIG. 10 may serve as user equipment involved in the method examples described herein and execute the steps executed by the user equipment in the method examples described herein. As shown in FIG. 10, the communication apparatus 1000 includes: a transceiving module 1001 and a processing module 1002, where the transceiving module 1001 and the processing module 1002 are coupled to each other. The transceiving module 1001 may be used to support the communication apparatus 1000 to perform communication. The transceiving module 1001 may have a wireless communication function. For example, the transceiving module may perform wireless communication with other communication apparatuses by means of a wireless radio. The processing module 1002 may be used to support the communication apparatus 1000 to execute processing actions in the method examples described herein, including, but not limited to, generating information and a message transmitted by the transceiving module 1001, and/or demodulating and decoding a signal received by the transceiving module 1001.

When the steps implemented by user equipment 101 are executed, the transceiving module 1001 is used to receive first indication information from a base station, where the first indication information is used to indicate a DRX mode; and the processing module is used to execute DRX according to the DRX mode.

In an embodiment, the transceiving module 1001 is further used to receive DCI from the base station through a PDCCH, where the DCI includes the first indication information.

In an embodiment, the transceiving module 1001 is further used to receive a reference signal from the base station through a PDSCH, where the reference signal includes the first indication information.

In an embodiment, the transceiving module 1001 is further used to receive MAC-CE information from the base station through a PDSCH, where the MAC-CE information includes the first indication information.

In an embodiment, the transceiving module 1001 is further used to receive third indication information from the base station, where the third indication information is used to indicate that the DRX mode corresponds to a mode of waking up a user or a mode of not waking up a user.

In an embodiment, the transceiving module 1001 is further used to receive an RRC signaling from the base station when the DRX mode corresponds to the mode of waking up a user, where the RRC signaling includes fourth indication information, where the fourth indication information is used to indicate a slot interval for detecting a PDCCH; and different DRX modes correspond to different slot intervals.

Figure 11:
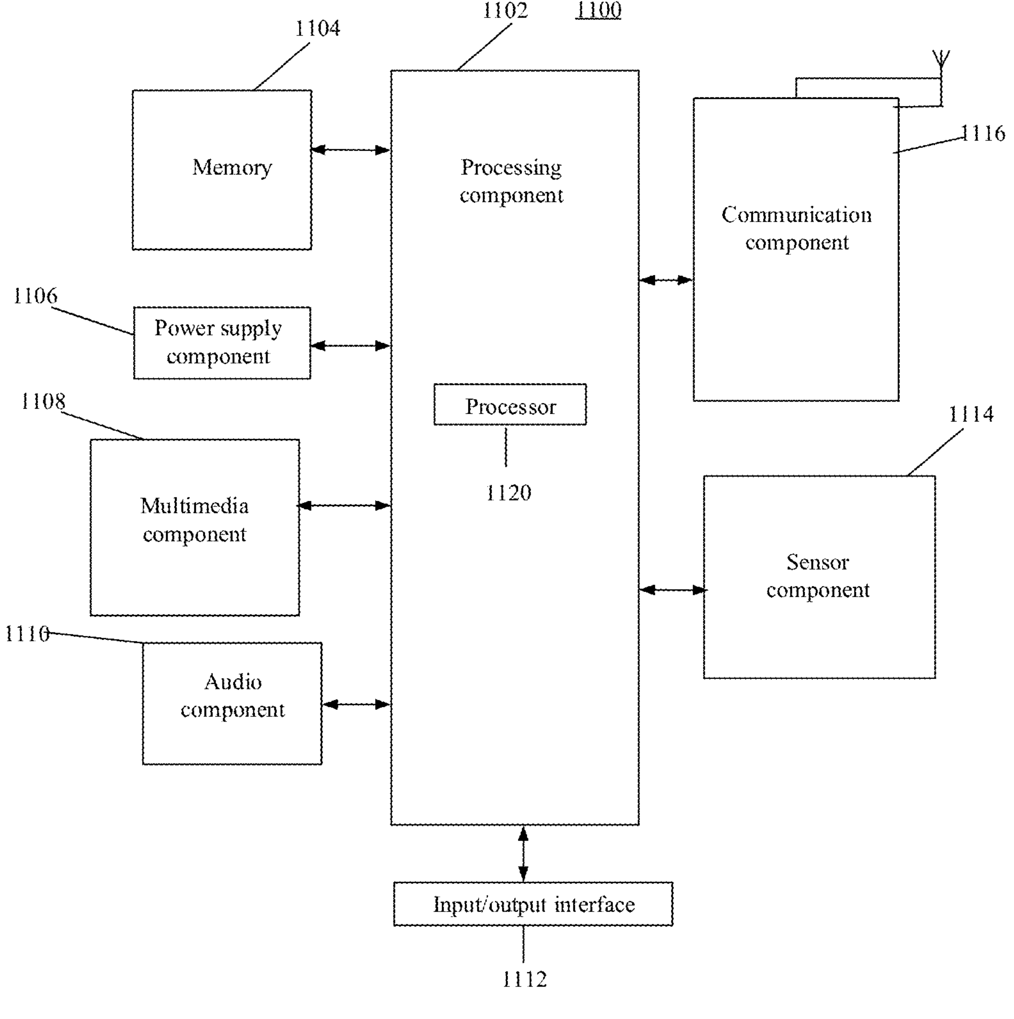
FIG. 11 is a structure diagram of another apparatus for transmitting indication information according to an example.

When the communication apparatus is user equipment, the structure of the communication apparatus may be further as shown in FIG. 11. With reference to FIG. 11, the apparatus 1100 may include one or more of the following components: a processing component 1102, a memory 1104, a power supply component 1106, a multimedia component 1108, an audio component 1110, an input/output (I/O) interface 1112, a sensor component 1114 and a communication component 1116.

The processing component 1102 generally controls overall operations of the apparatus 1100, such as operations associated with display, telephone calls, data communications, camera operations, and recording operations. The processing component 1102 may include one or more processors 1120 to execute an instruction to complete all or some of the steps of the method described herein. Further, the processing component 1102 may include one or more modules that facilitate interaction between the processing component 1102 and other components. For example, the processing component 1102 may include a multimedia module, so as to facilitate interaction between the multimedia component 1108 and the processing component 1102.

The memory 1104 is configured to store various types of data to support operations at the apparatus 1100. Examples of such data include instructions, contact data, phone book data, messages, pictures, videos, etc., for any application or method operated on the apparatus 1100. The memory 1104 may be implemented by any type of volatile or non-volatile storage device, or a combination of any type of volatile or non-volatile storage device, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk, or optical disk.

The power supply component 1106 provides power for various components of the apparatus 1100. The power supply component 1106 may include a power management system, one or more power supplies, and other components associated with generation, management and distribution of power for the apparatus 1100.

The multimedia component 1108 includes a screen that provides an output interface between the apparatus 1100 and a user. In some examples, a screen may include a liquid crystal display (LCD) and a touch panel (TP). If the screen includes the touch panel, the screen may be implemented as a touch screen to receive an input signal from a user. The TP includes one or more touch sensors to sense touches, swipes, and gestures on the TP. A touch sensor may not only sense a boundary of a touch or slide action, but also detect duration and pressure associated with the touch or slide operation. In some examples, a multimedia component 1108 includes a front camera and/or a rear camera. When the apparatus 1100 is in an operation mode, such as a photographing mode or a video mode, the front camera and/or the rear camera may receive external multimedia data. Each front camera and each rear camera may be a fixed optical lens system or have a focal length and an optical zoom capability.

The audio component 1110 is configured to output and/or input an audio signal. For example, the audio component 1110 includes a microphone (MIC). The MIC is configured to receive the external audio signal when the apparatus 1100 is in the operation mode, such as call mode, recording mode, and voice recognition mode. The received audio signal may be further stored in the memory 1104 or transmitted via the communication component 1116. In some examples, audio component 1110 further includes a speaker for outputting audio signals.

The I/O interface 1112 provides an interface between the processing component 1102 and a peripheral interface module. The peripheral interface module described herein may be a keyboard, a click wheel, a button, etc. The button may include, but not be limited to, a home button, a volume button, a start button, and a lock button.

The sensor component 1114 includes one or more sensors used to provide state evaluation of various aspects of the apparatus 1100. For example, the sensor component 1114 may detect an open/closed state of the apparatus 1100, and a relative positioning effect of components. For example, the component is a display and a keypad of the apparatus 1100. The sensor component 1114 may further detect a change in position of the apparatus 1100 or a component of the apparatus 1100, presence or absence of the user making contact with the apparatus 1100, orientation or acceleration/deceleration of the apparatus 1100, and a change in temperature of the apparatus 1100. The sensor component 1114 may include a proximity sensor configured to detect presence of nearby objects in the absence of any physical contact. The sensor component 1114 may further include a light sensor, such as a complementary metal-oxide-semiconductor (CMOS) image sensor or a charge-coupled device (CCD) image sensor, used in imaging applications. In some examples, the sensor component 1114 may further include an acceleration sensor, a gyro sensor, a magnetic sensor, a pressure sensor, or a temperature sensor.

The communication component 1116 is configured to facilitate communication between the apparatus 1100 and other devices in a wired or wireless manner. The apparatus 1100 may access a wireless network based on a communication standard, such as wireless fidelity (WiFi), second-generation (2G), third-generation (3G), or a combination of the WiFi, the 2G and the 3G. In an example, the communication component 1116 receives a broadcast signal or broadcast-related information from an external broadcast management system via a broadcast channel. In an example, the communication component 1116 further includes a near field communication (NFC) module to facilitate short-range communication. For example, the NFC module may be implemented on the basis of a radio frequency identification (RFID) technology, an infrared data association (IrDA) technology, an ultra wide band (UWB) technology, a Bluetooth (BT) technology, and other technologies.

In an example, the apparatus 1100 may be implemented by one or more application specific integrated circuits (ASICs), digital signal processors (DSPs), digital signal processing devices (DSPDs), programmable logic devices (PLDs), field programmable gate arrays (FPGAs), controllers, micro-controllers, micro-processors, or other electronic elements, and is used to execute the method described herein. Further, the structure provided by the communication apparatus 1100 and its various components can perform the functions of at least the various modules described herein.

In an example, a non-transitory computer-readable storage medium including an instruction is further provided, such as the memory 1104 including an instruction. The instruction is executable by the processor 1120 of the apparatus 1100, so as to complete the method described herein. For example, the non-transitory computer-readable storage medium may be a read only memory (ROM), a random access memory (RAM), a compact disc read-only memory (CD-ROM), a magnetic tape, a floppy disk, an optical data storage device, etc.

INDUSTRIAL APPLICABILITY

The DRX mode of the user equipment is determined according to the service data traffic and the CSI of the user equipment in the current DRX period, such that the DRX mode determined can be correlated with a real-time communication situation, thus making the DRX mode determined more intelligent and reasonable.

The invention claimed is:

1. A method for transmitting indication information, performed by a base station and comprising:

determining a discontinuous reception mode of user equipment according to service data traffic and channel state information of the user equipment in a current discontinuous reception period; and transmitting first indication information to the user equipment, wherein the first indication information is used to indicate the discontinuous reception mode, wherein determining the discontinuous reception mode of the user equipment according to the service data traffic and the channel state information of the user equipment in the current discontinuous reception period comprises:

inputting the service data traffic and the channel state information of the user equipment in the current discontinuous reception period into a deep learning model, determining N evaluation values output by the deep learning model, and determining a discontinuous reception mode corresponding to a maximum evaluation value of the N evaluation values.

2. The method according to claim 1, further comprising:

obtaining the deep learning model by training sample data; or receiving the deep learning model from a server, wherein the deep learning model is obtained by training sample data.

3. The method according to claim 1, further comprising:

obtaining historical data of the user equipment in a latest of an M consecutive discontinuous reception periods in the current discontinuous reception period; or obtaining historical data of the user equipment in latest M consecutive discontinuous reception periods when the current discontinuous reception period corresponds to an update opportunity; and obtaining the deep learning model according to the historical data of the user equipment in the M consecutive discontinuous reception periods, wherein the update opportunity corresponds to execution of one model update every K discontinuous reception periods, K and M are integers greater than 1, and K is greater than or equal to M, and the historical data comprises historical parameters of the user equipment in the M consecutive discontinuous reception periods, wherein the historical parameters comprise the service data traffic, the channel state information, a selected discontinuous reception mode, and evaluation values corresponding to N discontinuous reception modes.

4. The method according to claim 3, wherein obtaining the deep learning model according to the historical data of the user equipment in the M consecutive discontinuous reception periods comprises:

obtaining the deep learning model by updating a first model according to the historical data of the user equipment in the M consecutive discontinuous reception periods; or transmitting the historical data of the user equipment in the M consecutive discontinuous reception periods to a server, and receiving the deep learning model from the server, wherein the deep learning model is obtained by updating a first model on a basis of the historical data of the user equipment in the M consecutive discontinuous reception periods; and the first model is a model obtained by training sample data, or, the first model is a model obtained by training sample data and the historical data of the user equipment in the M consecutive discontinuous reception periods in a set historical period.

5. The method according to claim 3, wherein obtaining historical data of the user equipment in the latest of the M consecutive discontinuous reception periods comprises:

transmitting a request message to an operation administration and maintenance entity, wherein the request message is used to request the historical data of the user equipment in the M consecutive discontinuous reception periods to be obtained;

receiving a second indication message from the operation administration and maintenance entity, wherein the second indication message is used to indicate that data is ready and indicate a first address, and the first address is an address used to store the historical data of the user equipment in the M consecutive discontinuous reception periods; and obtaining the historical data of the user equipment in the M consecutive discontinuous reception periods from the first address.

6. The method according to claim 5, wherein transmitting a request message to the operation administration and maintenance entity comprises:

transmitting the request message to the operation administration and maintenance entity once every one of the M consecutive discontinuous reception periods.

7. The method according to claim 1, wherein transmitting the first indication information to the user equipment comprises:

transmitting downlink control information to the user equipment through a physical downlink control channel (PDCCH), wherein the downlink control information comprises the first indication information; or transmitting a reference signal to the user equipment through a physical downlink share channel (PDSCH), wherein the reference signal comprises the first indication information; or, transmitting media access control-control element (MAC-CE) information to the user equipment through the PDSCH, wherein the MAC-CE information comprises the first indication information.

8. The method according to claim 1, further comprising:

transmitting third indication information to the user equipment, wherein the third indication information is used to indicate that the discontinuous reception mode corresponds to a mode of waking up a user or a mode of not waking up the user.

9. The method according to claim 8, further comprising:

transmitting a radio resource control (RRC) signaling to the user equipment when the discontinuous reception mode corresponds to the mode of waking up the user, wherein the RRC signaling comprises fourth indication information, wherein the fourth indication information is used to indicate a slot interval for detecting a physical downlink control channel (PDCCH); and wherein different discontinuous reception modes correspond to different slot intervals.

10. The method according to claim 9, wherein the fourth indication information is:

monitoring slot periodicity and an offset field in a search space information element in a control resource set in physical downlink control channel (PDCCH) configuration information in the RRC signaling.

11. The method according to claim 1, further comprising:

constructing historical data of the user equipment in the current discontinuous reception period after the current discontinuous reception period ends, and transmitting the historical data of the user equipment in the current discontinuous reception period to an operation administration and maintenance entity, wherein the historical data in the current discontinuous reception period comprises the service data traffic, the channel state information, a selected discontinuous reception mode, and evaluation values corresponding to the discontinuous reception mode.

12. A communication apparatus, comprising a processor and a memory, wherein the memory stores a computer program; and the processor executes the computer program to implement the method according to claim 1.

13. A non-transitory computer-readable storage medium, storing an instruction, wherein the instruction causes a computer to execute the method according to claim 1 when called and executed on the computer.

14. A method for transmitting indication information, performed by user equipment and comprising:

receiving first indication information from a base station, wherein the first indication information is used to indicate a discontinuous reception mode; and executing discontinuous reception according to the discontinuous reception mode, wherein the discontinuous reception mode is determined by the base station by inputting service data traffic and channel state information of the user equipment in a current discontinuous reception period into a deep learning model, determining N evaluation values output by the deep learning model, and determining a discontinuous reception mode corresponding to a maximum evaluation value of the N evaluation values.

15. The method according to claim 14, wherein receiving first indication information from the base station comprises:

receiving downlink control information from the base station through a physical downlink control channel (PDCCH), wherein the downlink control information comprises the first indication information; or receiving a reference signal from the base station through a physical downlink share channel (PDSCH), wherein the reference signal comprises the first indication information; or receiving media access control-control element (MAC-CE) information from the base station through a PDSCH, wherein the MAC-CE information comprises the first indication information.

16. The method according to claim 14, further comprising:

receiving third indication information from the base station, wherein the third indication information is used to indicate that the discontinuous reception mode corresponds to a mode of waking up a user or a mode of not waking up the user.

17. The method according to claim 16, further comprising:

receiving radio resource control (RRC) signaling from the base station when the discontinuous reception mode corresponds to the mode of waking up the user, wherein the RRC signaling comprises fourth indication information, wherein the fourth indication information is used to indicate a slot interval for detecting a physical downlink control channel (PDCCH); and different discontinuous reception modes correspond to different slot intervals.

18. A non-transitory computer-readable storage medium, storing an instruction, wherein the instruction causes a computer to execute the method according to claim 14 when called and executed on the computer.

19. A communication apparatus, comprising a processor and a memory, wherein the memory stores a computer program; and when the computer program is executed by the processor, the processor:

receives first indication information from a base station, wherein the first indication information is used to indicate a discontinuous reception mode; and executes discontinuous reception according to the discontinuous reception mode, wherein the discontinuous reception mode is determined by the base station by: inputting service data traffic and channel state information of user equipment in a current discontinuous reception period into a deep learning model, determining N evaluation values output by the deep learning model, and determining a discontinuous reception mode corresponding to a maximum evaluation value of the N evaluation values.

* * * * *